(12) United States Patent
Nübl et al.

(10) Patent No.: US 12,535,070 B2
(45) Date of Patent: Jan. 27, 2026

(54) ECCENTRIC SCREW PUMP WITH WEAKENING RECESSES IN THE POWER TRAIN

(71) Applicant: Netzsch Pumpen & Systeme GmbH, Waldkraiburg (DE)

(72) Inventors: Philipp Nübl, Gras Bahnhof (DE); Dominik Sinseder, Dorfen (DE); Michael Mittermaier, Unterreit (DE); Daniel Bürger, Dorfen (DE); Stefan Weigl, Mühldrof (DE)

(73) Assignee: NETZSCH Pumpen & Systeme GmbH, Waldkraiburg (DE)

( * ) Notice: Subject to any disclaimer, the term of this patent is extended or adjusted under 35 U.S.C. 154(b) by 0 days.

(21) Appl. No.: 18/761,808

(22) Filed: Jul. 2, 2024

(65) Prior Publication Data
US 2025/0012276 A1   Jan. 9, 2025

(30) Foreign Application Priority Data

Jul. 6, 2023   (DE) ...................... 10 2023 117 805.9

(51) Int. Cl.
*F04C 2/107*   (2006.01)
*F04C 15/00*   (2006.01)
(Continued)

(52) U.S. Cl.
CPC ........ *F04C 2/1073* (2013.01); *F04C 15/0061* (2013.01); *F04C 15/0065* (2013.01);
(Continued)

(58) Field of Classification Search
CPC ............... F04C 2/1073; F04C 15/0061; F04C 15/0065; F04C 2240/80; F16D 3/12; F16D 3/28; F16D 3/62
See application file for complete search history.

(56) References Cited

U.S. PATENT DOCUMENTS 3,139,035 A * 6/1964 Walter .................. F04C 2/1073
406/96
8,152,499 B2 * 4/2012 Brun ..................... F04C 2/1071
418/152
(Continued)

FOREIGN PATENT DOCUMENTS

CZ   309552 B6   4/2023
DE   3840728 A1   6/1990
(Continued)

OTHER PUBLICATIONS

Machine Translation of WIPO Publication WO 2017/186495 A1, 1st Inventor: Eglmeier; Title: Household Appliance; Published: Nov. 2, 2017. (Year: 2017).*
(Continued)

*Primary Examiner* — Mary A Davis
(74) *Attorney, Agent, or Firm* — Whitmyer IP Group LLC

(57) ABSTRACT

Eccentric screw pump with a rotor of a drive shaft circulating essentially about a fixed axis in relation to the stator in a bearing block, a power train and a screw conveyor, which revolves in a rotating-oscillating manner in a screw flight of the stator, wherein the power train provides the screw conveyor with its drive torque and the power train adjusts the differences of the motion sequences of the screw conveyor and of the drive shaft, wherein the power train consists essentially of a one-piece rotational body, which has multiple weakening recesses, which interrupt its outer circumferential jacket surface more than only insignificantly and which provide it with that reversible elasticity, which it requires in order to rotate about an axis of rotation, which curves in a periodically recurring manner at least in sections.

14 Claims, 6 Drawing Sheets

(51) Int. Cl.
    *F16D 3/12*     (2006.01)
    *F16D 3/28*     (2006.01)
    *F16D 3/62*     (2006.01)

(52) U.S. Cl.
    CPC ............ *F04C 2240/80* (2013.01); *F16D 3/12* (2013.01); *F16D 3/28* (2013.01); *F16D 3/62* (2013.01)

(56) References Cited

U.S. PATENT DOCUMENTS

| 2017/0184155 | A1 | 6/2017 | Mathis |
| 2025/0012277 | A1* | 1/2025 | Nübl ................... F04C 2/1073 |

FOREIGN PATENT DOCUMENTS

| DE | 4206974 | A1 | 9/1992 |
| DE | 10335966 | B3 | 8/2004 |
| DE | 102011014284 | A1 | 9/2012 |
| DE | 102016207245 | A1 | 11/2017 |
| DE | 102022115814 | A1 | 6/2023 |
| DE | 102023117805 | A1 | 1/2025 |
| EP | 4488523 | A1 | 1/2025 |
| JP | 2000145660 | A | 5/2000 |
| WO | 2016013504 | A1 | 1/2016 |
| WO | 2017186495 | A1 | 11/2017 |

OTHER PUBLICATIONS

Machine Translation of WIPO Publication WO 2016/013504 A1; 1st Inventor: Tanaka; Title: Unicaxial Eccentric Screw Pump; Published: Jan. 28, 2016. (Year: 2016).*
German Office Action; Application No. 102023117 805.9; Completed: Mar. 27, 2025; 132 Pages.

* cited by examiner

ECCENTRIC SCREW PUMP WITH WEAKENING RECESSES IN THE POWER TRAIN

TECHNICAL FIELD

The invention relates to an eccentric screw pump with a rotor of a drive shaft circulating essentially about a fixed axis in relation to a stator in a bearing block, a power train and a screw conveyor, which revolves in a rotating-oscillating manner in a screw flight of the stator. The invention also relates to a corresponding power train of the eccentric screw pump.

BACKGROUND

Eccentric screw pumps belong to the group of the rotating positive displacement pumps and are used predominantly to convey a plurality of media, in particular of viscous, highly viscous and abrasive media. The main components of an eccentric screw pump are a rotating rotor and a stationary stator.

The rotor of the eccentric screw pump is thereby preferably formed by a drive shaft of a drive motor, a power train and a screw conveyor. The screw conveyor is preferably helically wound and moves in a rotating oscillating manner in the stationary stator. For the most part, the screw conveyor is currently attached in an articulated or elastic manner on one side.

The power train provides the screw conveyor with its drive torque and the power train adjusts the differences of the motion sequences of the screw conveyor and of the drive shaft. In particular the eccentricity between drive shaft and screw conveyor has to be adapted thereby during the rotational movement.

According to the prior art, this currently takes place for the most part by means of a long coupling rod with a respective joint at each end of the coupling rod, thus similarly as in the case of a cardan shaft.

This leads to a high number of components and to a large installation length, in particular due to the necessary length of the coupling rod. The joints thereof are subject to a wear risk. In addition, a lubrication of the joints is frequently necessary, which means an additional effort on the one hand and causes the risk that the lubricant can reach into the medium to be conveyed on the other hand.

Coupling rods, which are created by means of known production methods according to the prior art, have a high percentage of wear to some extent and require a lot of maintenance. In addition, the production thereof by means of the current manufacturing methods is expensive for the most part.

SUMMARY

It is accordingly the object of the invention to specify a means by which a high-capacity and thereby cost-efficient connection can be realized between drive shaft and screw conveyor.

This and other objects of the present teachings are achieved by providing an eccentric screw pump, which comprises a rotor, which comprises a drive shaft circulating essentially about a fixed axis in relation to the stator in a bearing block, a power train and a screw conveyor, is proposed for this purpose, wherein the screw conveyor revolves in a rotating-oscillating manner in a screw flight of the stator.

The power train provides the screw conveyor with its drive torque and the power train adjusts the differences of the motion sequences of the screw conveyor and of the drive shaft—as already described above.

The eccentric screw pump according to the invention is characterized in that the power train consists essentially of a one-piece rotational body, which has multiple weakening recesses, which interrupt its outer circumferential jacket surface more than only insignificantly, wherein these weakening recesses preferably run in predominantly or in essentially radial direction. In any case, the weakening recesses run in essentially radial direction when the height of the weakening recess is greater than the width of the weakening recess, wherein the height is defined by the maximum expansion thereof in the radial direction and the width is defined by the maximum expansion thereof in the axial direction.

The weakening recesses are designed so that they provide the power train with that reversible elasticity, which it requires in order to rotate about an axis of rotation, which curves in a periodically recurring manner at least in sections. This axis of rotation, which curves in a periodically recurring manner at least in sections forms, during the operation of the eccentric screw pump due to the differences of the motion sequences of the screw conveyor and of the drive shaft between them, as already mentioned above.

In general, the power train according to the invention is preferably connected directly or indirectly to the drive shaft on the one side and to the screw conveyor on the other side. Due to the weakening recesses and the elasticity of the power train associated therewith, the power train can adapt the mentioned eccentricity, wherein the power train nonetheless provides the necessary stiffness in order to safely transmit the torque; even in the case of changed connecting pitches, which are shortened in particular compared to the prior art.

Due to the fact that the power train consists essentially of a one-piece rotational body, the number of components as well as the production costs are lowered significantly compared to the prior art. The installation length can additionally be shortened compared to the prior art. Due to the fact that external joints are preferably not used for the connection, the maintenance effort and the tendency to wear can also be reduced here.

A "weakening recess" of the mentioned rotational body is preferably a recess and/or depression, which runs essentially radially from the outer circumferential jacket surface thereof in the direction of the axis of rotation thereof and thus interrupts the outer circumferential jacket surface thereof.

This interruption of the outer circumferential jacket surface is thereby "more than only insignificant", which is attained (not only, but) at least when a weakening recess has at least a maximum width of 3 mm, preferably even at least 5 mm as well as a maximum height of at least 10 mm, preferably even at least 15 mm.

In any case, a "one-piece" part in terms of the invention means a coherent part, at least 95% of which consists of a uniform material and preferably a part, which is molded in one piece.

A preferred embodiment of the eccentric screw pump according to the invention consists in that the rotational body forming the power train consists essentially of a polymer material—preferably molded in one piece—and ideally polyamide or of a metal material—preferably molded in one piece. The production costs for the power train can thus be kept low, but wherein the desired properties of the elasticity as well as stiffness can be attained and can also be set in a very sensitive constructive manner for the most part. The 3D printing of plastics and/or metals, in particular out of the powdery original shape, has turned out to be a particularly effective and thus preferred solution for the problem to be solved here in spite of the production process, which is forced thereby and which is still extremely time-consuming in the case of such large components. Such a 3D print leaves behind a special inter-grain structure, in which a weakening is inherent operationally in the region of the boundaries of the grains, which are connected to one another, to a certain, at least roughly controllable extent. A peculiar flexibility and/or damping behavior, which deviates from other molding methods for these materials and which is used for the purposes of the invention and leads to a surprisingly significant improvement of the result, is created thereby.

It is thus not surprising when it is postulated in a first approximation that it is particularly preferred when the power train on average has a structure of particles, which are merged with one another not completely seamlessly—preferably viewed at maximally 10-fold magnification. The "installed" porosity effected thereby or microstructure weakened by microcavities, respectively, has a positive impact on the elasticity of the power train.

A further preferred embodiment of the eccentric screw pump according to the invention is that the rotational body forming the power train consists of several disks, directly adjacent disks of which are connected to one another via a—single- or multi-part—strip, which is elastic in such a way that adjacent disks can carry out a rocking movement in relation to one another, which is generally reversibly-elastic (preferably with ≥0.75 mm in the direction of the axis of rotation or with its local tangent also being more than only insignificant), about the strip during each circulation, wherein directly adjacent strips are arranged in positions rotated in relation to one another. In addition, adjacent or directly adjacent strips, respectively, are ideally arranged so as to be rotated in relation to one another so that the strip longitudinal axes run at right angles to one another.

The desired elasticity can thus be attained on the one hand and the required stiffness for transmitting the torque can be ensured on the other hand.

It is additionally particularly preferred when, on its side facing away from the screw conveyor, the rotational body forming the power train has a connecting member, which can be connected in a rotationally fixed manner to a positive locking member of the drive shaft. A torque-transmitting connection between the drive shaft and the power train can thus be attained in a simple way.

It is furthermore particularly preferred when, on its side facing the screw conveyor, the rotational body forming the power train has an opening or a tubular appendage, which is of such a nature that the end of the screw conveyor can be held firmly therein in a positively locking-rotationally fixed manner due to its screw shape. The opening or the tubular appendage likewise preferably—at least partially—has a screw shape. A torque-transmitting connection between the screw conveyor and the power train can thus be attained in a simple way.

It is furthermore particularly preferred when, on the side facing the screw conveyor, the opening or the tubular appendage has at least one threaded bore. The latter is preferably used for the purpose of introducing a screw or a threaded pin, particularly preferably a grub screw, for additionally securing the screw conveyor in the opening or in the tubular appendage.

Further design options, modes of action and advantages follow from the description of the exemplary embodiment and/or on the basis of the figures.

DETAILED DESCRIPTION

Figure 1:
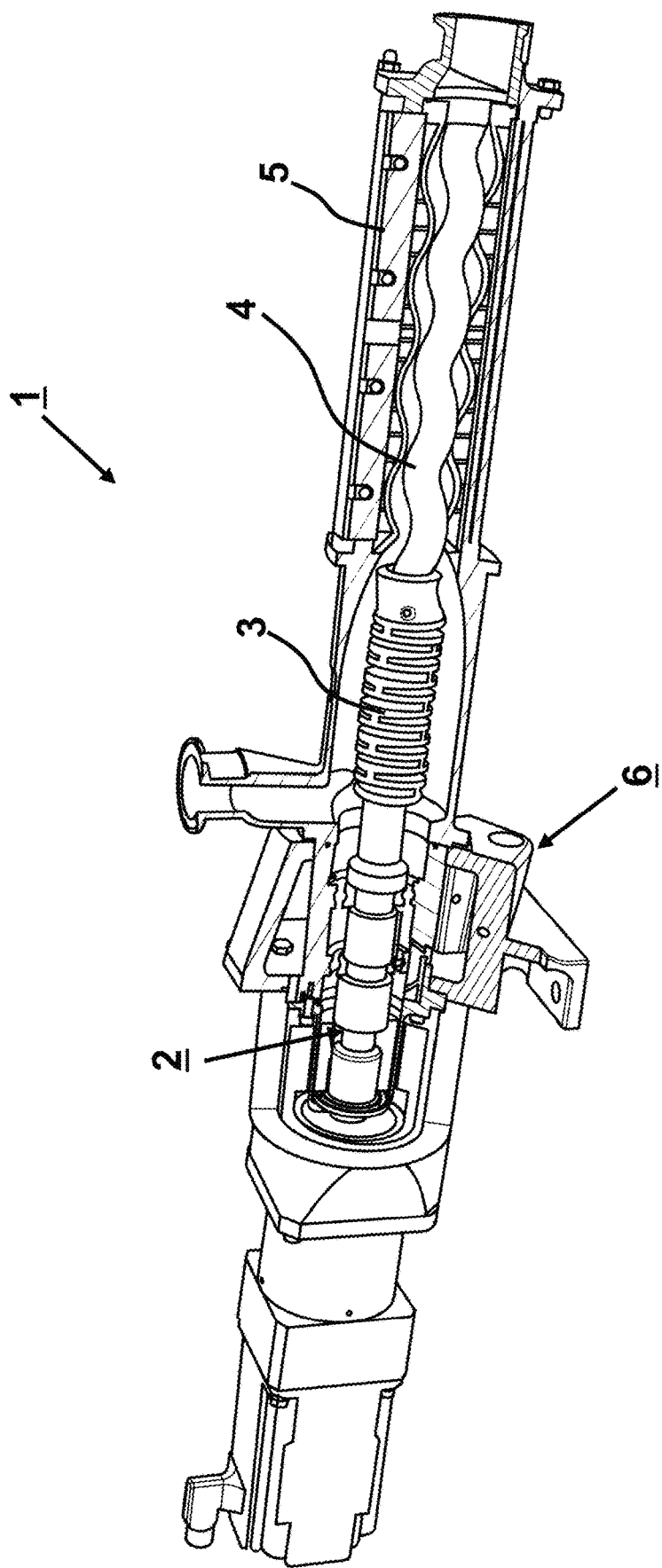
FIG. 1 shows an eccentric screw pump according to the invention in three-dimensional view.

FIG. 1 initially shows an eccentric screw pump 1 according to the invention. The latter comprises a rotor, which, in turn, comprises the drive shaft 2, the power train 3 and the screw conveyor 4. The screw conveyor 4 runs in the stator 5 in a rotating-oscillating manner. As shown in FIG. 1, the drive shaft 2 circulates in a bearing block 6. This bearing block 6 preferably has an internal roller bearing. The power train 3 preferably represents the direct connection between the drive shaft 2 and the screw conveyor 4.

Figure 2:
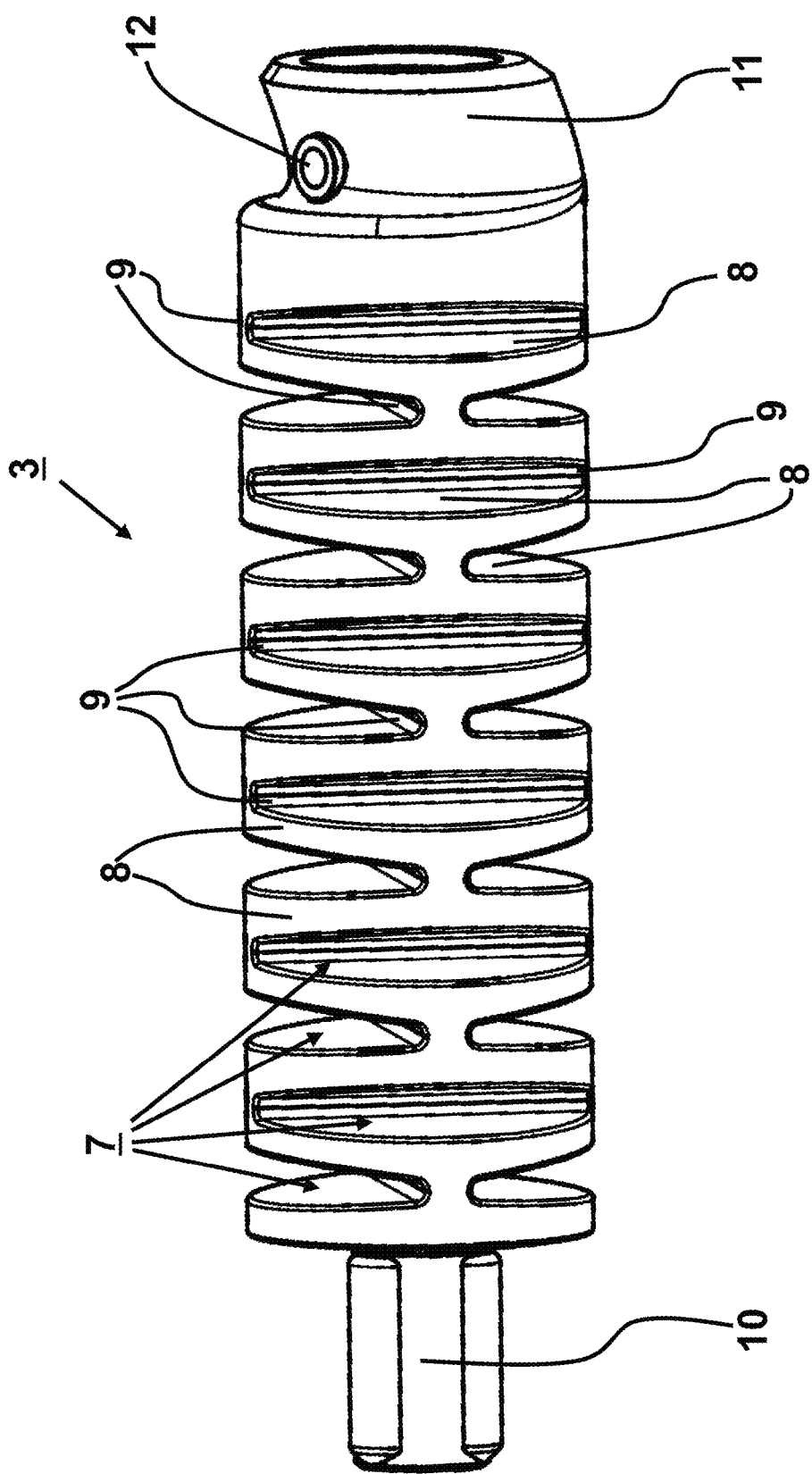
FIG. 2 shows a power train according to the invention in three-dimensional view.
Figure 3:
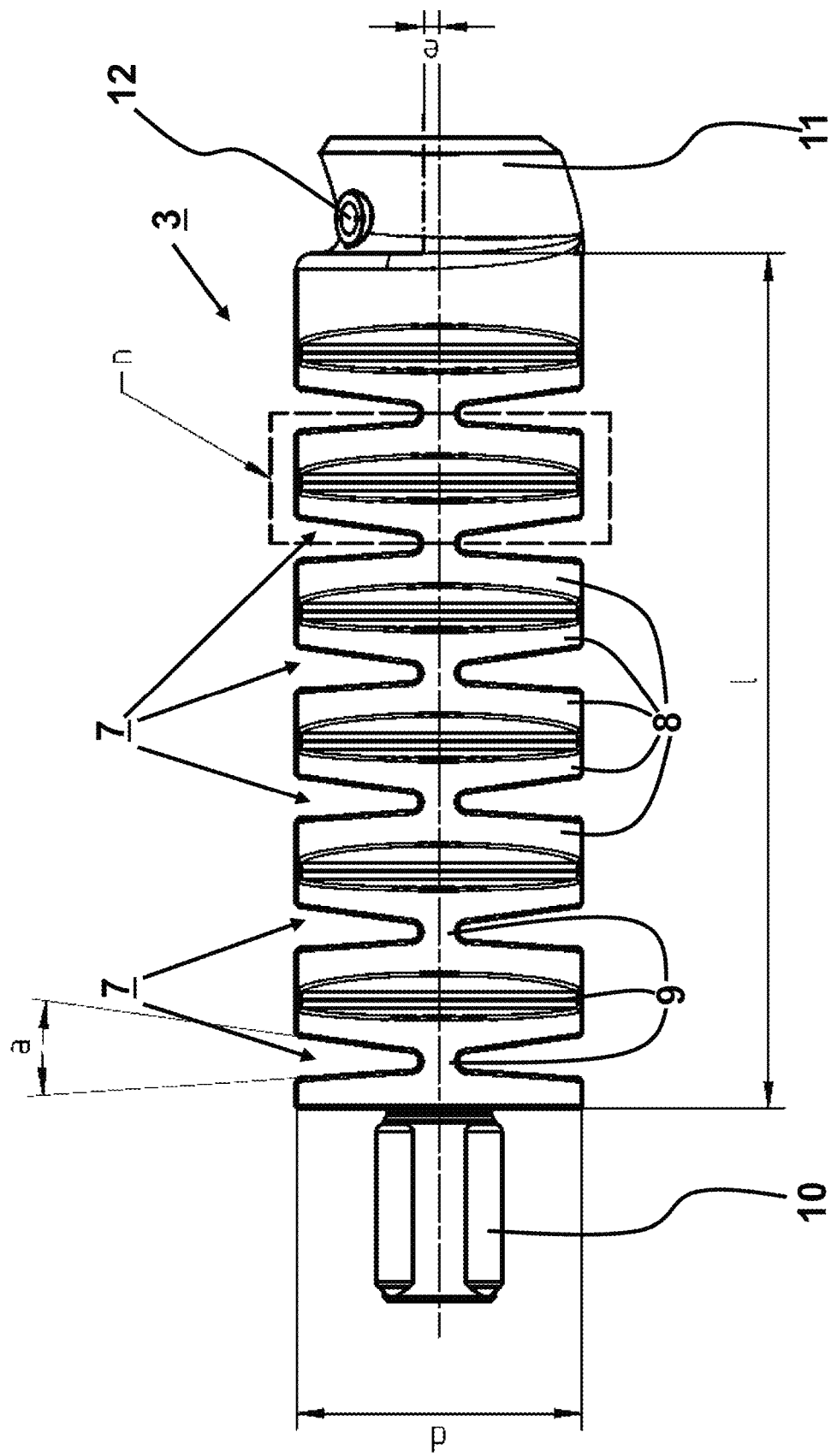
FIG. 3 shows the power train according to the invention from FIG. 2 in the top view.

A first exemplary embodiment of this power train 3 is shown in more detail in Figures FIG. 2 and FIG. 3. The power train 3 consists essentially of a one-piece rotational body, which has several weakening recesses 7. These weakening recesses 7 are preferably embodied and arranged in such a way that the rotational body consists of several disks 8, wherein directly adjacent disks 8 are connected to one another via a strip 9. These strips 9 are preferably arranged so that directly adjacent strips 9 are rotated in relation to one another so that the strip longitudinal axes run at a right angle to one another, completely or at least essentially.

It is preferred that the outermost disk, thus that one of the disks 8, which lies closest to the drive shaft 2, and/or that one of the disks 8, which lies closest to the screw conveyor 4, in each case has a shape, which deviates from the other disks 8. These outermost disks 8 are preferably thicker than the other disks 8.

The connecting member 10, which can be connected to a positive locking member of the drive shaft 2 in a rotationally fixed manner, is preferably located directly adjacent to the outermost disk 8, which lies closest to the drive shaft 2.

An opening or—as in the shown exemplary embodiment—a tubular appendage 11, as can be seen well in FIG. 2 and FIG. 3, is preferably located directly adjacent to the outermost disk 8, which lies closest to the screw conveyor 4. This tubular appendage 11 is of such a nature that the end of the screw conveyor 4 can be fixed in a positively locking-rotationally fixed manner therein due to its screw shape. This fixed position of an inserted screw conveyor 4 can be seen in FIG. 4. In addition, a threaded bore is preferably also attached (often in a metallic threaded bush "transfer-print" all around on its circumferential jacket) to the tubular appendage 11, particularly preferably even directly adjacent to the outermost disk 8. An additional securing element, preferably a screw or a threaded pin, particularly preferably a grub screw 12, can be screwed in with the help of this threaded bore. For the most part, this provides for a pull-out guard against longitudinal pull-out or unwanted unscrewing, respectively, in reverse operation and/or a general securing of the connection.

FIG. 3 furthermore also shows some measures, by means of which the preferred dimensions of a power train 3 according to the invention can be specified. It is thus preferred that the angle a between two adjacent disks 8 preferably lies in a range of 0° to 30°. This contributes to a desired flexibility of the power train 3. The diameter d of a disk 8 is preferably essentially identical for all disks 8 of a power train. The length l preferably identifies the maximum dimension in the axial direction from the outermost disk 8, which lies closest to the screw conveyor 4, all the way to the outermost disk 8, which lies closest to the drive shaft 2. The ratio k of the diameter d to the length l preferably lies in the range between 0.3 and 1. The axial expansion of the power train 3 is thus preferably greater than the radial expansion, which contributes to the desired flexibility. The eccentricity e is preferably the distance (or also: difference in position) between the axis of the connecting member 10 and the axis of the vertical end of the tubular appendage 11, which points away from the screw conveyor 4. The ratio of the eccentricity e to the ratio k preferably lies in the range of 1 to 4. In addition, a recurring section or also repeat n can be seen in FIG. 3. The ratio of n to the ratio k thereby preferably lies in the range of 5 to 50.

Figure 4:
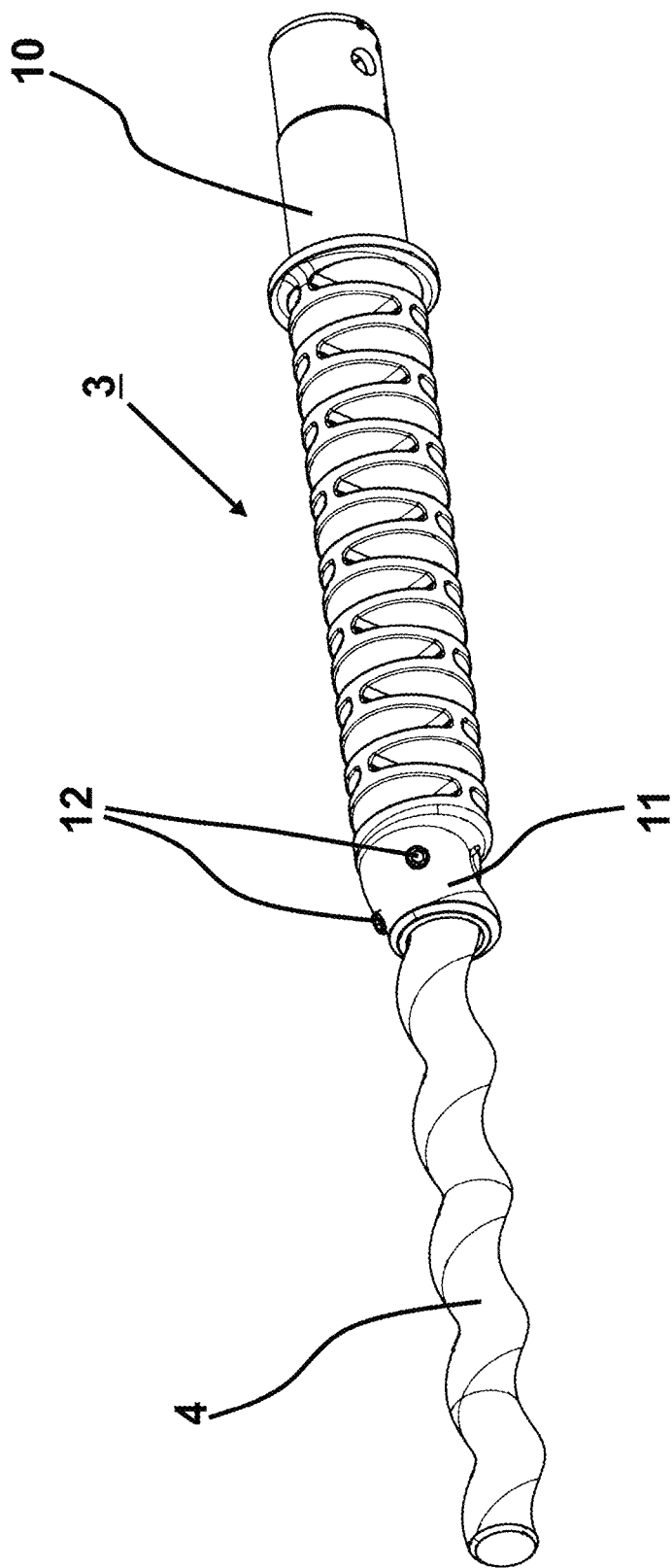
FIG. 4 shows the power train according to the invention from FIG. 2 with connected screw conveyor and alternative connecting member.

FIG. 4 shows the power train 3 described in FIG. 2 and FIG. 3, wherein an alternative connecting member 10 is shown here, which is preferably printed onto the outermost disk 8, which lies closest to the drive shaft 2. While the connecting member 10 shown in FIGS. 2 and 3 is preferably received in a positively locking-rotationally fixed manner by the drive shaft 2, the connecting member 10 shown in FIG. 4 receives the drive shaft 2 in a positively locking-rotationally fixed manner.

Figure 5:
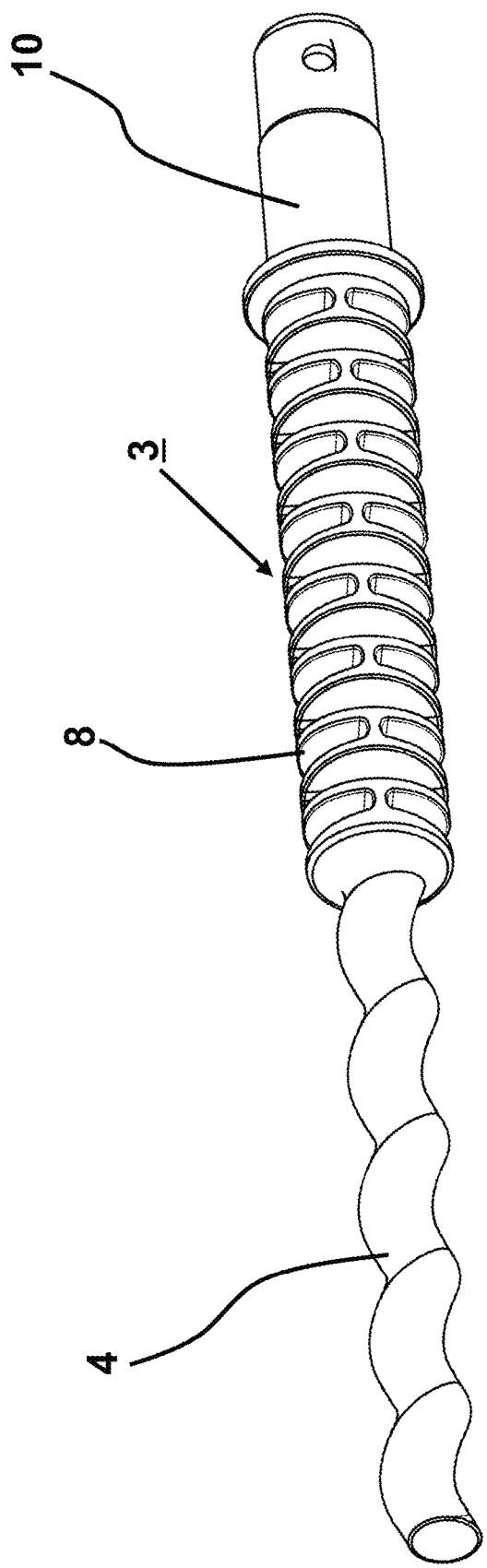
FIG. 5 shows a further exemplary embodiment of a power train according to the invention with printed-on screw conveyor.

FIG. 5 shows a further embodiment of the power train 3, wherein the outermost disk 8, which lies closest to the screw conveyor 4, is connected directly to the screw conveyor 4 here, the outermost disk 8 is preferably printed with the screw conveyor 4. The power train 3 and in particular the disks 8 thereof, are thereby designed to be essentially flat. Compared to this, the disks 8 of the first embodiment are curved and/or are embodied with variable thickness. Both embodiments of the disks 8 are possible.

Figure 6:
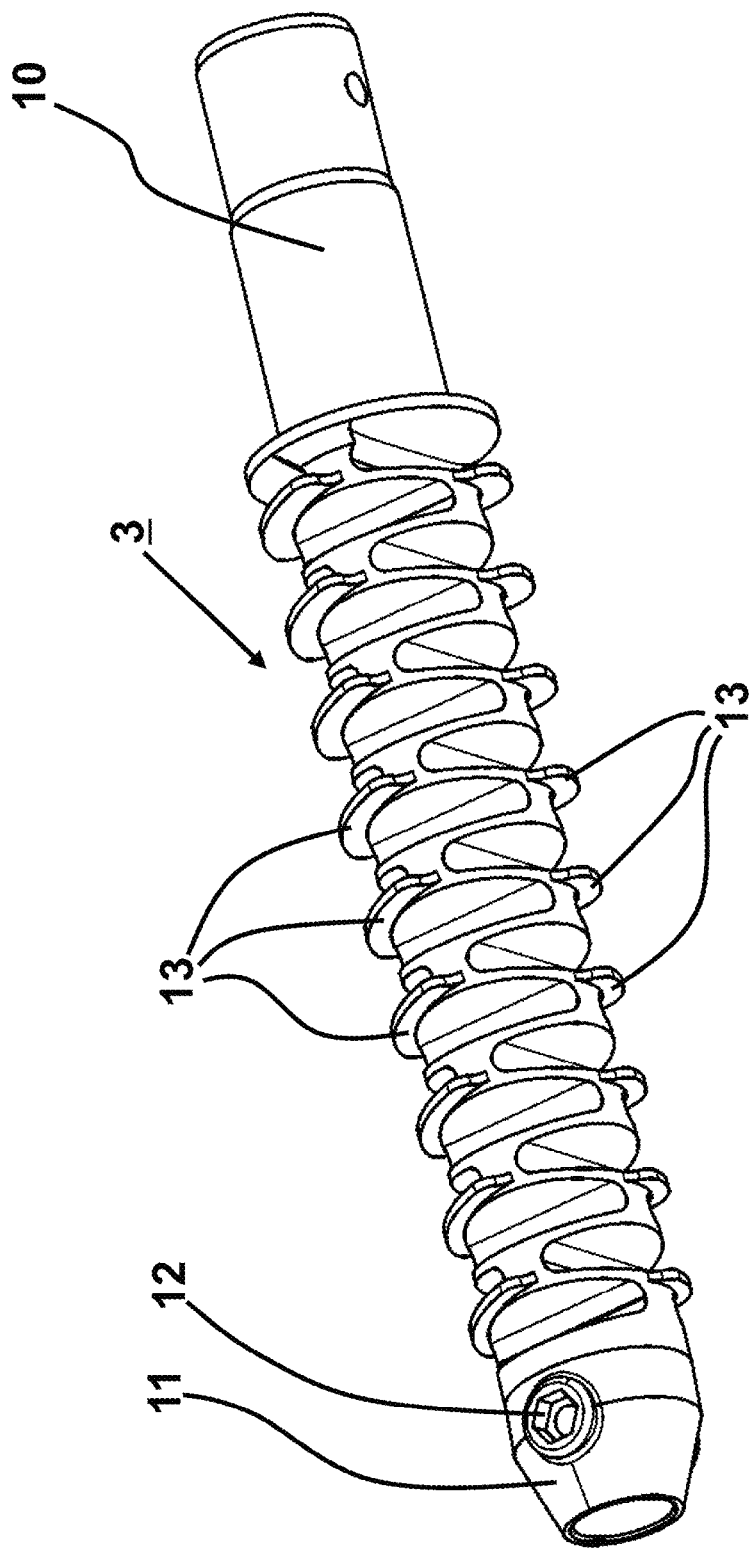
FIG. 6 shows a further embodiment of the power train according to the invention with additional ribs.

FIG. 6 shows a further embodiment of the power train according to the invention with additional ribs 13. These ribs 13 take over a conveying effect and have the result that the product is pushed forward in the direction of the screw conveyor 3.

The invention claimed is:

1. An eccentric screw pump comprising
a rotor with a drive shaft, a power train and a screw conveyor, the screw conveyor configured to perform a rotating-oscillating motion within a stator,
characterized in that the power train comprises: a one-piece rotational body, the rotational body having:
a plurality of adjacent disks connected by elastic strips, each elastic strip providing for a pair of the adjacent disks to carry out a rocking movement in relation to one another about the elastic strip during rotation of the drive shaft, each elastic strip having a longitudinal axis, the elastic strips being arranged in positions rotated relative to each other such that the longitudinal axes are orthogonal, and
multiple weakening recesses which interrupt an outer circumferential jacket surface of the rotational body, wherein the weakening recesses and the adjacent disks connected by the elastic strips provide the rotational body with reversible elasticity for rotation about an axis that is periodically curved.

2. The eccentric screw pump according to claim 1, characterized in that the rotational body comprises a polymer material molded in one piece or a metal material molded in one piece.

3. The eccentric screw pump according to claim 2, characterized in that, on its side facing away from the screw conveyor, the rotational body forming the power train has a connecting member, which can be connected in a rotationally fixed manner to a positive locking member of the drive shaft.

4. The eccentric screw pump according to claim 2, characterized in that, on a side facing the screw conveyor, the rotational body forming the power train has an opening or a tubular appendage, which is configured to firmly hold an end of the screw conveyor in a positively locking-rotationally fixed manner due to a screw shape.

5. The eccentric screw pump according to claim 1, characterized in that the power train on average has a structure of particles, which are merged with one another not completely seamlessly.

6. The eccentric screw pump according to claim 1, characterized in that, on its side facing away from the screw conveyor, the rotational body forming the power train has a connecting member, which can be connected in a rotationally fixed manner to a positive locking member of the drive shaft.

7. The eccentric screw pump according to claim 1, characterized in that, on a side facing the screw conveyor, the rotational body forming the power train has an opening or a tubular appendage, which is configured to firmly hold an end of the screw conveyor in a positively locking-rotationally fixed manner due to a screw shape.

8. The eccentric screw pump according to claim 7, characterized in that on the side facing the screw conveyor, the opening or the tubular appendage has at least one threaded bore.

9. The eccentric screw pump according to claim 1, characterized in that each weakening recess has a width of at least 3 mm and a height of at least 10 mm.

10. The eccentric screw pump according to claim 1, characterized in that the power train is a 3D printed power train that is manufactured from a polymer or metal powder and has a microstructure with inter-grain porosity that enhances elasticity.

11. The eccentric screw pump according to claim 1, characterized in that the power train includes a tubular appendage with a screw-shaped inner contour configured to receive the screw conveyor in a rotationally fixed manner, and includes at least one threaded bore configured to secure the screw conveyor via a grub screw.

12. The eccentric screw pump according to claim 1, characterized in that the adjacent disks of the power train are flat or curved, and an outermost disk of said adjacent disks is thicker than the others.

13. A power train of an eccentric screw pump, the screw pump including a drive shaft and a screw conveyor configured to perform a rotating-oscillating motion within a stator, the power train comprising:
a one-piece rotational body, the rotational body having:
a plurality of adjacent disks connected by elastic strips, each elastic strip providing for a pair of the adjacent disks to carry out a rocking movement in relation to one another about the elastic strip during rotation of the drive shaft each elastic strip having a longitudinal axis, the elastic strips being arranged in positions rotated relative to each other such that the longitudinal axes are orthogonal, and multiple weakening recesses which interrupt an outer circumferential jacket surface of the rotational body wherein the weakening recesses and the adjacent disks connected by the elastic strips provide the rotational body with reversible elasticity for rotation about an axis that is a periodically curved.

14. The power train according to claim 13, characterized in that the rotational body comprises a polymer material molded in one piece or a metal material molded in one piece.

* * * * *